United States Patent [19]
Cooper

[11] Patent Number: 6,105,706
[45] Date of Patent: Aug. 22, 2000

[54] PERSONAL MOBILITY VEHICLE WITH MOVABLE SEAT

[75] Inventor: Stanley C. Cooper, Bradenton, Fla.

[73] Assignee: Hoveround Corporation, Sarasota, Fla.

[21] Appl. No.: 09/052,653

[22] Filed: Mar. 31, 1998

[51] Int. Cl.[7] .............................. A61G 5/10; B60N 2/12; B60N 2/24
[52] U.S. Cl. ............... 180/282; 180/907; 280/250.1; 297/344.11; 297/330; 297/DIG. 4; 701/49
[58] Field of Search .......................... 280/304.1, 250.1, 280/755; 180/282, 290, 907, 89.13; 297/344.1, 344.11, 327, 330, DIG. 4; 701/45, 49

[56] References Cited

U.S. PATENT DOCUMENTS

| 4,274,503 | 6/1981 | Mackintosh | 180/907 |
| 4,614,246 | 9/1986 | Masse et al. | 180/907 |
| 5,044,647 | 9/1991 | Patterson | 280/304.1 |
| 5,346,280 | 9/1994 | Deumite | 180/907 |

*Primary Examiner*—Peter C. English
*Attorney, Agent, or Firm*—A. W. Fisher, III

[57] ABSTRACT

A personal mobility vehicle or powered wheelchair comprising a seat operatively mounted to a carriage by a seat positioning assembly including a linear positioning assembly to selectively position the seat longitudinally relative to the carriage to maintain the weight distribution of the personal mobility vehicle and occupant between the front and rear of the personal mobility vehicle within a predetermined weight distribution pattern during operation of the personal mobility vehicle to enhance the static and dynamic stability thereof.

11 Claims, 4 Drawing Sheets

PERSONAL MOBILITY VEHICLE WITH MOVABLE SEAT

BACKGROUND OF THE INVENTION

1. Field of the Invention

A personal mobility vehicle or powered wheelchair comprising a seat movably mounted to a carriage to control the position of the seat relative to the carriage during operation of the personal mobility vehicle.

2. Description of the Prior Art

Personal mobility vehicles commonly known as wheelchairs have been used to improve the mobility of disabled or handicapped persons. In instances where an individual has limited or no use of his or her legs, a wheelchair may be the sole means of transportation.

It is desirable for a paralyzed person to be able to shift or move his or her body on the wheelchair from time to time. This periodic shifting of the weight of a person's body is essential to prevent ulcers, infection and possible gangrene. Various wheelchairs have been designed to permit the seat to be tilted to shift the body weight to permit circulation in the essential skin areas.

U.S. Pat. No. 5,356,172 shows a hand-propelled wheelchair frame element to which is mounted a pair of large drive wheels and a pair of front caster wheels. A seat unit is slidably mounted on the frame in such a manner as to be manually slidable in a plurality of positions along the frame element to vary the weight distribution of the user and the seat unit with reference to the axis of the drive wheels.

U.S. Pat. No. 5,297,021 discloses a wheelchair seat backrest assembly with a counter-balance to provide equilibrium. A control loop is included on the sliding backrest to sense the onset of shear and compensate the backrest to a zero shear position during recline.

U.S. Pat. No. 4,274,503 relates to a wheelchair assembly including an occupant seat having a central shaft for mounting the seat on an undercarriage for universal tilting movement and vertical movement along the shaft axis and for rotation about such axis.

U.S. Pat. No. 4,759,561 teaches a wheelchair comprising an underframe with front and rear wheels and a seat which can be tilted forward and backward relative to the underframe in such a way that the overall weight distribution of seat part and wheelchair user essentially assumes a fixed position relative to the underframe.

U.S. Pat. No. 5,121,806 discloses a power wheelchair including a torsional frame and stability frame to provide automatic compensation for directional tracking errors caused by shifts in the mass center of an occupant.

GB 2 141 980 shows a wheelchair comprising a chassis which is longitudinally adjustable. The relative position of the seat and the rear wheels may be adjusted to vary the weight distribution of the wheelchair. As a result the stability against tipping may be increased when obstructions and obstacles such as curbs are negotiated.

GB 2 048 791 discloses a wheelchair comprising a frame with four wheels and a seat mounted on the frame for forward and rearward adjustment by means of slides. The seat is mounted on a pivotal parallelogram linkage. The seat comprises a tiltable backrest portion and raisable arms.

U.S. Pat. No. 3,891,269 teaches a mounting mechanism for a seat reciprocally movable on a surface is provided with a seat support having wheels for rolling engagement on the surface. A locking member is selectively movable between a locking position in which the locking member is releasably engaged between at least one of the wheels and the surface to prevent movement of the seat support on the surface in one direction and a released position in which the locking member is not engaged with both the one wheel and the surface to permit movement of the seat support along the surface in the one direction.

U.S. Pat. No. 3,952,822 shows an electrically powered wheel-chair. To improve stability, the weight distribution of the batteries is located on the same side of the longitudinal axis of the chair as the steering wheel.

Additional examples of the prior art are found in U.S. Pat. Nos. 4,951,766; 5,301,964 and GB 2 244 684.

SUMMARY OF THE INVENTION

The present invention relates to a seat positioning assembly operatively coupling a seat to a carriage to provide a personal mobility vehicle or powered wheelchair capable of adjusting for changes in the weight distribution of the power wheelchair and as the powered wheelchair travels over the supporting surface to enhance the static and dynamic stability of the powered wheelchair.

The carriage comprises a carriage frame having a carriage platform affixed to the upper portion thereof and a carriage housing affixed to the lower portion thereof to operatively enclose a system control means, a vehicle drive means or motor and a power source. A front swivel wheel assembly is mounted to opposite sides of the forward portion of the carriage frame; while, a rear drive wheel assembly is mounted on opposite sides of the rear portion of the carriage frame by a transverse drive axle operatively coupled to the vehicle drive means or motor to power the powered wheelchair over the supporting surface in response to control signals from the system control means in accordance control commands from the occupant.

The seat comprises a back portion having an arm rest attached to opposite sides thereof and a seat portion including a seat support platform movably coupled to the carriage by the seat positioning assembly described more fully hereinafter.

The seat positioning assembly comprises a linear positioning means to control the longitudinal position of the seat relative to the carriage to maintain the weight distribution of the powered wheelchair and occupant between the front and rear wheel assemblies of the personal mobility vehicle during operation. Specifically, the linear positioning means comprises a linear actuator including a linear positioning device movable between a forward position, an intermediate or mid position and a rearward position to move the seat fore and aft on the carriage.

Alternately, the carriage may comprise a carriage frame having the carriage platform hingedly attached at the rear portion thereof by a hinge or platform connecting means and pivotally coupled to a linear positioning means to selectively rotate the carriage platform to pivot upward on the hinge or platform connecting means up to approximately 50 degrees relative to the supporting surface.

The seat positioning assembly further comprises a sensing means to provide an electrical signals proportional to the pressure exerted on the carriage. In particular, the pressure sensing means comprises a sensor installed on each front swivel wheel assembly and each rear drive wheel assembly to sense the instantaneous force exerted upward from the point of contact with the supporting surface to provide an output proportional to the weight exerted on the individual sensors.

The system control means includes a controller coupled to the sensing means. The controller is programmed with predetermined weight distribution pattern for the weight distribution of the powered wheelchair and occupant. Processing circuits within the controller compare differences between the weight distribution on the front and rear wheel assemblies within the predetermined weight distribution pattern and that measured or sensed by the plurality of sensors and generates a control signal to operate the seat positioning assembly to position the seat and occupant within the predetermined weight distribution pattern necessary to provide static and dynamic stability.

Otherwise, the powered wheelchair may be controlled and maneuvered by the occupant in a manner similar to that described in U.S. Pat. No. 5,249,636.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
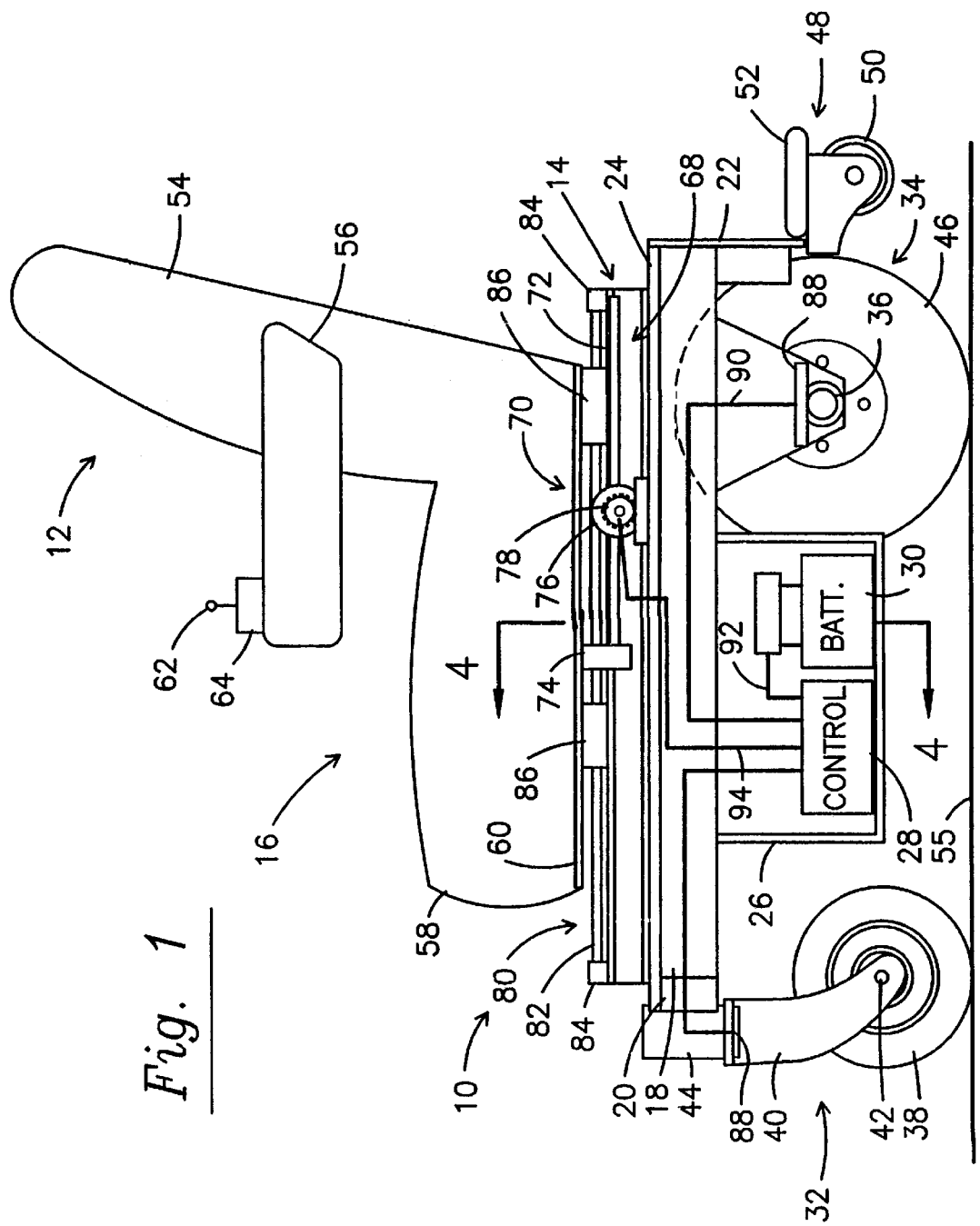
FIG. 1 is a side view of the personal mobility vehicle of the present invention.
Figures 2, 3:
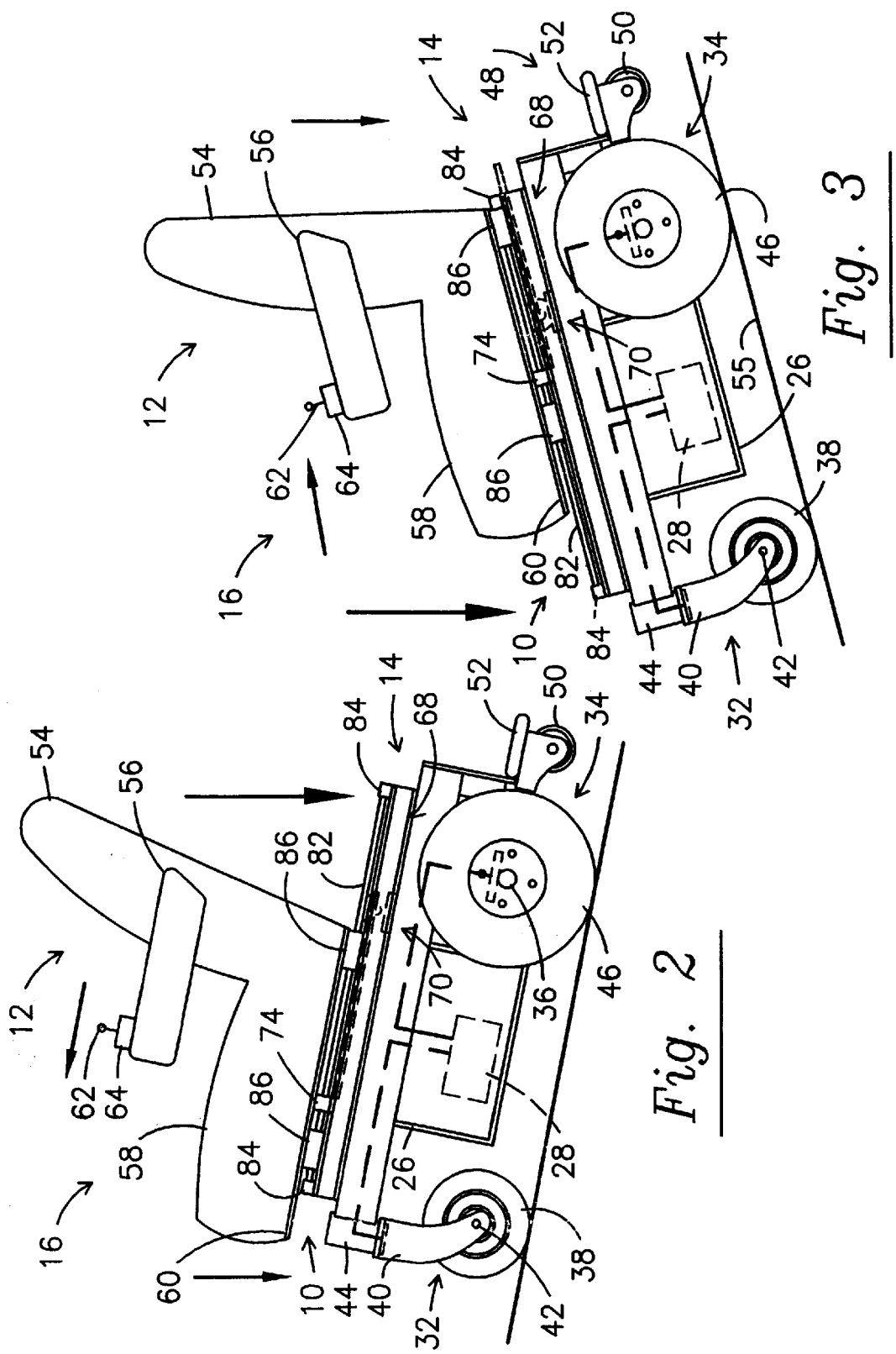
FIG. 2 is a side view of the personal mobility vehicle of the present invention with the seat in the forward position.
FIG. 3 is a side view of the personal mobility vehicle of the present invention with the seat in the rearward position.

As shown in FIGS. 1 through 3, the present invention relates to a seat positioning assembly generally indicated as 10 operatively coupling a seat generally indicated as 12 to a carriage generally indicated as 14 to provide a personal mobility vehicle or powered wheelchair generally indicated as 16 capable of compensating for changes in the weight distribution of the powered wheelchair 16 and the occupant (not shown) as the powered wheelchair 16 travels over the supporting surface to enhance the static and dynamic stability of the powered wheelchair 16.

As shown in FIGS. 1 through 3, the carriage 14 comprises a carriage frame including a pair of side frame members each indicated as 18 held in substantially parallel spaced relationship relative to each other by substantially parallel front and rear frame members indicated as 20 and 22 respectively having a carriage platform 24 affixed to the upper portion thereof and a carriage housing 26 affixed to the lower portion thereof to operatively enclose a system control means 28, a vehicle drive means (not shown) and a power source 30 such as a DC storage battery. The carriage frame is supported on the supporting surface 55 by a front carriage support means and a rear carriage support means coupled to the front and rear portion of the carriage frame respectively.

The front carriage support means comprises a front swivel wheel assembly generally indicated as 32 is mounted to the forward portion of each of the side frame members 18; while the rear carriage support means comprises a rear drive wheel assembly generally indicated as 34 is mounted on opposite sides of the rear portion of the carriage frame by a transverse drive axle 36 operatively coupled to the vehicle drive means (not shown) to power the powered wheelchair 16 over the supporting surface 55 in response to control signals from the system control means in accordance control commands from the occupant. The drive means (not shown) and power source 30 are similar in operation to those in the art.

Each front swivel wheel assembly 32 comprises a wheel 38 rotatably mounted to a swivel bracket 40 by a pin or axle 42 which is, in turn, rotatably mounted to the corresponding side frame member 18 by a swivel mounting member 44. Each rear drive wheel assembly 34 comprises a drive wheel 46 affixed to the corresponding end portion of the drive axle 36.

A combination anti-tip, anti-scuff assembly generally indicated as 48 is mounted to opposite sides of the rear frame member 22. Each combination anti-tip, anti-scuff assembly 48 comprises anti-tip wheel 50 and an anti-scuff roller 52 similar in structure and function to the anti-tip wheels and anti-scuff rollers described and disclosed in U.S. Pat. No. 5,413,187.

As shown in FIGS. 1 through 3, the seat 12 comprises a back portion 54 having an arm rest 56 attached to opposite sides thereof and a seat portion 58 including a seat support platform 60 movably coupled to the carriage 14 by the seat positioning assembly 10 as described more fully hereinafter.

The powered wheelchair 16 may be controlled and maneuvered by the occupant in a manner similar to that described in U.S. Pat. No. 5,249,636 or other such state of the art controls. For example, a control lever 62 such as an inductive joystick is mounted at the lower end for pivotal movement at the upper end in all directions within a control box 64 attached to the front portion of one of the arm rests 56 of the seat 12 so that the control lever 62 is accessible to an occupant (not shown) seated in the powered wheelchair 16.

Propulsion of the powered wheelchair 16 is controlled by the movement of the control lever 62 which signals the control box 64 including logic means to control the drive means (not shown) to control the direction of travel of the powered wheelchair 16. Of course, the drive means can comprise a single motor or a dual motor for directional control. Moreover, while a rear wheel drive is shown, a front wheel drive can be used.

Figure 4:
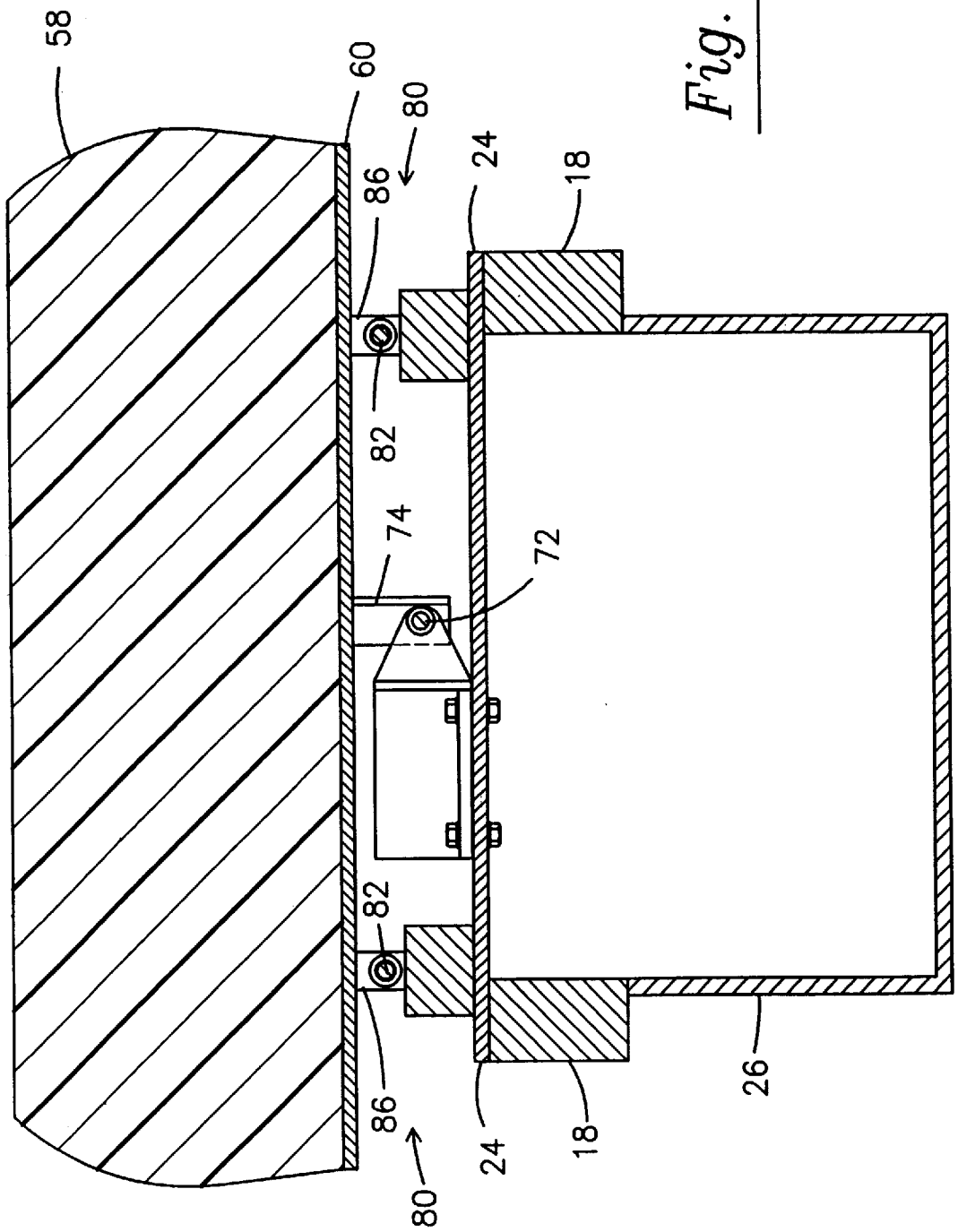
FIG. 4 is a cross-sectional side view of the personal mobility vehicle of the present invention taken along line 4—4 of FIG. 1.

As shown in FIGS. 1 and 4, the seat positioning assembly 10 comprises a linear positioning means to control the longitudinal position of the seat 12 relative to the carriage 14 to maintain the weight distribution of the powered wheelchair 16 and the occupant (not shown) on the front and rear wheel assemblies 32 and 34 respectively during operation of the powered wheelchair 16. Specifically, the linear positioning means comprises a linear actuator including a linear positioning device generally indicated as 68 operatively coupled to a linear drive means generally indicated as 70. The linear positioning device comprises an elongated partially externally threaded positioning member or shaft 72 affixed to the seat support platform 60 by an attachment block or member 74 and movable between a forward position (FIG. 2), an intermediate or mid position (FIG. 1) and a rearward position (FIG. 3) to move the seat 12 fore and aft on the carriage 14. The linear drive means 70 comprises a reversible drive motor 76 including an output gear or screw 78 disposed to engage the elongated partially externally threaded positioning member or shaft 72 to selectively move or position the seat 12 relative to the carriage 14. Of course, other suitable linear actuators such as hydraulic assembly or a wheel including a groove to frictionally engage the elongated positioning member or shaft 72 may be used.

The seat positioning assembly further includes a seat stabilizer or directional control means to maintain the seat 12 in longitudinal alignment relative to the center line of the carriage 14. Specifically, the seat stabilizer or directional control means comprises a seat stabilizer or directional control assembly generally indicated as 80 disposed beneath each side of the seat 12. Each seat stabilizer or directional control assembly 80 comprises an elongated linear bearing support shaft 82 affixed in spaced relationship relative to the carriage platform 24 by a pair of support shaft mounting members or blocks each indicated as 84 disposed at opposite end portions thereof and a corresponding pair of linear bearings each indicated as 86 attached to the seat support platform 60 and slidably mounted on the corresponding elongated linear bearing support shaft 82.

The seat positioning assembly 10 further comprises a pressure sensing means to provide an electrical signals proportional to the pressure exerted on the carriage 14. In particular, the pressure sensing means comprises a sensor 88 installed on each front swivel wheel assembly 32 and each rear drive wheel assembly 34 to sense the instantaneous force exerted upward from the point of contact with the supporting surface 55 to provide an output signal proportional to the weight exerted on each of the individual sensors 88. Alternatively, the sensors 88 may be installed only to the front and rear portions of the carriage frame.

The system control means 28 includes a stability controller coupled to the sensing means through conductor 90. The controller is programmed with a predetermined weight distribution pattern within which the weight distribution of the powered wheelchair 16 and occupant may be adjusted. Processing circuits or logic means within the controller compare the difference between the weight distribution on the front and rear carriage support means or the front and rear wheel assemblies 32 and 34 respectively with the predetermined weight distribution pattern and that measured or sensed by the plurality of sensors 88 and generates a control signal to operate the seat positioning assembly 10 to maintain the weight distribution of the personal mobility vehicle 16 and the occupant (not shown) within the predetermined weight distribution pattern during operation of the personal mobility vehicle 16 to enhance the static and dynamic stability thereof. For example, in a rear wheel driven personal mobility vehicle 16, the weight would be distributed approximately one-third on the front wheel assemblies 32 and approximately two-thirds on the rear wheel assemblies 34. Conversely, in a front wheel drive personal mobility vehicle 16, the weight would be distributed approximately two-thirds on the front wheel assemblies 32 and approximately one-third on the rear wheel assemblies 34.

As shown in FIG. 1, the system control means 28 is operatively coupled to the power source 30 and the linear drive means 70 by conductors 92 and 94 respectively.

When operating the personal mobility vehicle 16 on a level supporting surface 55, the seat 12 will be positioned on the mid-portion of the carriage 14 as shown in FIG. 1 such that the weight distribution will be within the predetermined weight distribution pattern. However, as the personal mobility vehicle 16 is operated up an inclined supporting surface 55, the uneven distribution of weight is sensed by the sensors 88 causing the system control means to actuate the linear drive means 70 moving the seat 12 forward on the carriage 14 until the weight is redistributed on the front swivel wheel assembly 32 and the rear wheel assembly 34 to within the predetermined weight distribution pattern. Conversely, as the personal mobility vehicle 16 is operated down an inclined surface 55, the uneven distribution of weight is sensed by the sensors 88 causing the system control means to actuate the linear drive means 70 moving the seat 12 rearward on the carriage 14 until the weight is redistributed on the front swivel wheel assemblies 32 and the rear wheel assemblies 34 such that the weight distribution is within the predetermined weight distribution pattern.

Figure 5:
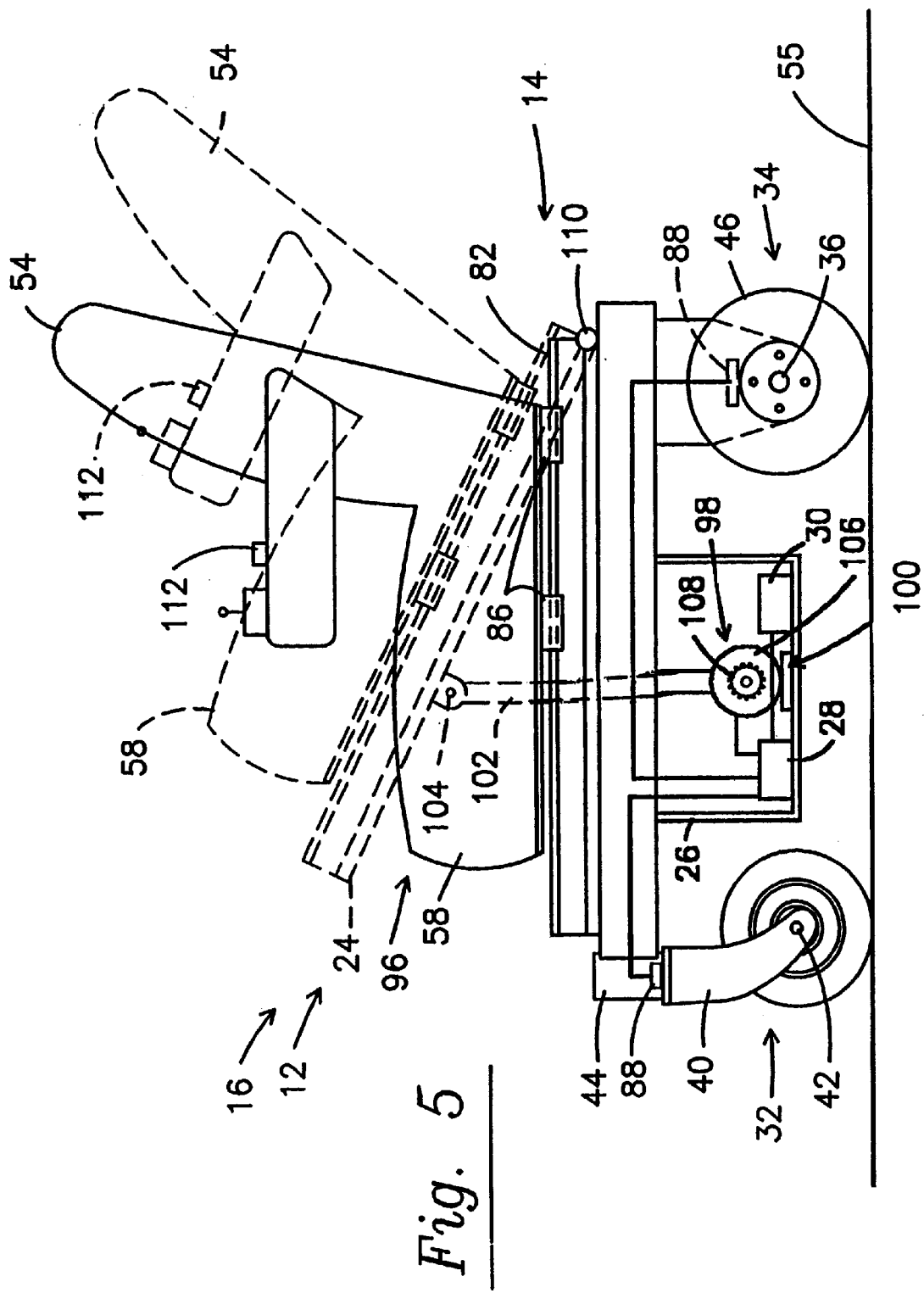
FIG. 5 is a side view of an alternate embodiment of the personal mobility vehicle of the present invention.

FIG. 5 shows an alternate embodiment of the personal mobility vehicle 16. Specifically, the seat positioning assembly 10 further comprises a rotational positioning means generally indicated as 96 to allow the operator to tilt the seat 12 backward to gain relief from constant pressure on the buttocks. Prior to that tilt, the seat 12 is positioned on the mid portion of the carriage 14 as shown in FIG. 1 such that the weight distribution will be within the predetermined weight distribution pattern. Specifically, the rotational positioning means comprises a linear actuator including a rotational positioning device generally indicated as 98 operatively coupled to a rotational drive means generally indicated as 100. The rotational positioning device 98 comprises an elongated partially externally threaded positioning member or shaft 102 pivotally attached to the carriage platform 24 by pivot pin 104 and movable between a lower position and an upper position to pivot the seat 12 on the carriage 14. The rotational drive means 100 comprises a reversible drive motor 106 including an output gear or screw 108 disposed to engage the elongated partially externally threaded positioning member or shaft 102 to selectively move or position the seat 12 relative to the carriage 14. Of course, other suitable linear actuators such as hydraulic assembly or a wheel including a groove to frictionally engage the elongated positioning member or shaft 102 may be used. The carriage platform 24 is hingedly attached at the rear portion of the carriage frame by a hinge or platform connecting means 110 and pivotally coupled to the rotational positioning device 98 by the pivot pin 104 to selectively rotate the carriage platform 24 to pivot the seat 12 upward on the hinge or platform connecting means 110 up to approximately 50 degrees relative to the supporting surface 55.

A control switch 112, positioned in an appropriate position to be operated by the seat occupant, will cause the elongated partially externally threaded positioning member or shaft 102 to extend and thereby pivot the carriage platform 24 and the seat 12 on the hinge or platform connecting means 110. During this process, there will be a moment shift detected by sensors 88. The stability controller of the system control means 28 will generate a control signals to seat linear positioning device 68 in such a manner as to cause the seat 12 to slide in a forward or reverse direction on the carriage 14 to maintain the weight distribution between front and rear within the predetermined weight distribution pattern.

The stability controller may be operated in the automatic mode such that any error between the ideal weight distribution and the actual instantaneous weight distribution will cause an output from the controller that will move the seating system to the ideal without operator intervention. Alternately, the stability controller may be operated in the semi-automatic mode such that any error between the ideal weight distribution and the actual instantaneous weight distribution will be calculated by the controller but will not make automatic correction until the operator initiates such by way of an electrical switch or similar. Moreover, the stability controller may be operated in the manual mode such that any error between the ideal weight distribution and the actual instantaneous weight distribution will be calculated by the controller and used to advise the vehicle operator of any error and which direction the seat should be moved to correct that error. In addition, the stability controller will provide an output alarm should an unstable condition be approached. This will occur when the limits of adjustments have been reached without compensating for measured errors or when, in the semi automatic or manual modes, an error has been indicated by the controller but the seat 12 has not been moved for compensation.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A personal mobility vehicle to transport an occupant seated therein from place to place on a supporting surface comprising a seat operatively mounted to a carriage by a seat positioning assembly to selectively position said seat longitudinally relative to said carriage to maintain the weight distribution of said personal mobility vehicle and occupant within a predetermined weight distribution pattern during operation of said personal mobility vehicle to enhance the static and dynamic stability thereof, said carriage comprises a carriage frame including a front portion and a rear portion supported on the supporting surface by a front carriage support means and a rear carriage support means coupled to said front and rear portions of said carriage frame respectively, said seat positioning assembly further comprises a pressure sensing means to provide electrical signals proportional to the pressure exerted on said front carriage support means and said rear carriage support means, and a system control means including a controller coupled to said pressure sensing means, said controller including logic to compare the difference between the weight distribution on said front and rear carriage support means with the predetermined weight distribution pattern and to generate a control signal fed to said seat positioning assembly to move said seat relative to said carriage.

2. The personal mobility vehicle of claim 1 wherein said seat comprises a back portion and a seat portion including a seat support platform movably coupled to said carriage by said seat positioning assembly and said seat positioning assembly comprises a linear positioning means to control the longitudinal position of said seat relative to said carriage.

3. The personal mobility vehicle of claim 2 wherein said linear positioning means comprises a linear actuator including a linear positioning device operatively coupled to a linear drive means.

4. The personal mobility vehicle of claim 3 wherein said linear positioning device of said linear positioning means comprises an elongated positioning member affixed to said seat support platform by an attachment member and movable between a forward position, an intermediate position and a rearward position to move said seat fore and aft on said carriage and said linear drive means comprises a drive motor including an output means disposed to engage said elongated positioning member to selectively move said seat.

5. The personal mobility vehicle of claim 2 wherein said seat positioning assembly further includes a directional control means to maintain said seat in longitudinal alignment relative to said carriage.

6. The personal mobility vehicle of claim 5 wherein said carriage further includes a carriage platform and said directional control means comprises a directional control assembly disposed beneath opposite sides of said seat, each said directional control assembly comprises an elongated linear bearing support shaft affixed in spaced relationship relative to said carriage platform by a pair of support shaft mounting members disposed at opposite end portions thereof and corresponding linear bearings attached to said seat support platform and slidably mounted on said corresponding elongated linear bearing support shaft.

7. The personal mobility vehicle of claim 1 wherein the controller is operable in an automatic mode such that any error between the predetermined weight distribution pattern and an actual instantaneous weight distribution will cause an output from the controller that will move the seat to establish the predetermined weight distribution pattern without occupant intervention.

8. A personal mobility vehicle to transport an occupant seated therein from place to place on a supporting surface comprising a seat operatively mounted to a carriage by a seat positioning assembly to selectively position said seat longitudinally relative to said carriage to maintain the weight distribution of said personal mobility vehicle and occupant within a predetermined weight distribution pattern during operation of said personal mobility vehicle to enhance the static and dynamic stability thereof, said carriage comprises a carriage frame including a front portion and a rear portion supported on the supporting surface by a front carriage support means and a rear carriage support means coupled to said front and rear portions of said carriage frame respectively, said seat positioning assembly further comprises a pressure sensing means to provide electrical signals proportional to the pressure exerted on said front carriage support means and said rear carriage support means, and a system control means including a controller coupled to said pressure sensing means, said controller including logic to compare the difference between the weight distribution on said front and rear carriage support means with the predetermined weight distribution pattern and to generate a control signal fed to said seat positioning assembly to move said seat relative to said carriage, said seat comprises a back portion and a seat portion including a seat support platform movably coupled to said carriage by said seat positioning assembly and said seat positioning assembly comprises a linear positioning means to control the longitudinal position of said seat relative to said carriage, said linear positioning means comprises a linear actuator including a linear positioning device operatively coupled to a linear drive means.

9. The personal mobility vehicle of claim 8 wherein said seat positioning assembly further includes a directional control means to maintain said seat in longitudinal alignment relative to said carriage.

10. The personal mobility vehicle of claim 9 wherein said carriage further includes a carriage platform and said directional control means comprises a directional control assembly disposed on opposite sides of said seat, each said directional control assembly comprises an elongated linear bearing support shaft affixed in spaced relationship relative to said carriage platform by a pair of support shaft mounting members disposed at opposite end portions thereof and corresponding linear bearings attached to said seat support platform and slidably mounted on said corresponding elongated linear bearing support shaft.

11. The personal mobility vehicle of claim 8 wherein said linear positioning device of said linear positioning means comprises an elongated positioning member affixed to said seat support platform by an attachment member and movable between a forward position, an intermediate position and a rearward position to move said seat fore and aft on said carriage and said linear drive means comprises a drive motor including an output means disposed to engage said elongated positioning member to selectively move said seat.

* * * * *